United States Patent
Givens

(10) Patent No.: US 8,465,005 B2
(45) Date of Patent: Jun. 18, 2013

(54) PNEUMATIC MULTI-WEIGHT BALANCING DEVICE

(75) Inventor: Raymond D. Givens, Ilderton (CA)

(73) Assignee: Givens Engineering Inc. (CA)

( * ) Notice: Subject to any disclaimer, the term of this patent is extended or adjusted under 35 U.S.C. 154(b) by 0 days.

(21) Appl. No.: 13/361,310

(22) Filed: Jan. 30, 2012

(65) Prior Publication Data

US 2012/0211709 A1    Aug. 23, 2012

Related U.S. Application Data

(63) Continuation of application No. 11/872,020, filed on Oct. 14, 2007, now Pat. No. 8,105,008.

(60) Provisional application No. 60/948,989, filed on Jul. 10, 2007.

(51) Int. Cl.
| | |
|---|---|
| A62B 3/00 | (2006.01) |
| B66F 3/24 | (2006.01) |
| E21D 15/44 | (2006.01) |
| B66D 1/48 | (2006.01) |
| B66D 1/36 | (2006.01) |
| B66D 1/00 | (2006.01) |
| H01L 21/687 | (2006.01) |
| A47H 1/10 | (2006.01) |

(52) U.S. Cl.
USPC ......... 254/93 R; 254/270; 254/264; 254/331; 414/672; 248/325

(58) Field of Classification Search
USPC .. 254/93 R, 270, 274, 264, 236, 31; 414/672, 414/458; 248/325, 161
See application file for complete search history.

(56) References Cited

U.S. PATENT DOCUMENTS

| | | | | |
|---|---|---|---|---|
| 3,253,840 | A | * | 5/1966 | Granning .................. 280/425.1 |
| 3,260,508 | A | * | 7/1966 | Powell .......................... 254/331 |
| 3,286,989 | A | | 11/1966 | Bangerter et al. |
| 3,457,837 | A | * | 7/1969 | Powell ............................ 91/447 |
| 3,526,388 | A | | 9/1970 | Gieger et al. |
| 3,537,686 | A | * | 11/1970 | McKendrick ................. 254/264 |
| 3,635,442 | A | * | 1/1972 | Ulbing .......................... 254/264 |
| 3,758,079 | A | | 9/1973 | Workman, Jr. et al. |
| 3,791,627 | A | | 2/1974 | Stone et al. |
| 3,856,266 | A | * | 12/1974 | McKendrick ................. 254/386 |
| 3,880,393 | A | * | 4/1975 | Watson ......................... 248/325 |
| 3,998,432 | A | | 12/1976 | Uldricks et al. |
| 4,500,074 | A | * | 2/1985 | Fox et al. ....................... 254/270 |
| 5,083,892 | A | * | 1/1992 | Oswald et al. ................ 414/458 |
| 5,269,644 | A | | 12/1993 | Vatel |

(Continued)

*Primary Examiner* — Lee D Wilson
*Assistant Examiner* — Alvin Grant
(74) *Attorney, Agent, or Firm* — Katten Muchin Rosenman LLP

(57) ABSTRACT

A pneumatic load balancing device having an inflatable reservoir establishing via an amplifier a pressure within a lift chamber that is sufficient to balance the weight of an object being lifted. The reservoir is inflated and deflated by inflation and deflation valves that may be operated from an operator control center proximal an end effector of the device. The valves may be actuated via pushbuttons or in a mutually exclusively fashion via a neutrally biased reciprocating actuator. The device allows loads of different weights to be lifted in a semi-automatic fashion with operator involvement to select the load balancing pressure. The device may have an air release system that closes a blocking valve in the event of release of the object and optionally in the event of a loss of air supply. The pressure within the lift chamber is thereby preserved and can be vented at different rates.

20 Claims, 5 Drawing Sheets

U.S. PATENT DOCUMENTS

| | | | | |
|---|---|---|---|---|
| 5,299,906 A | * | 4/1994 | Stone | 187/275 |
| 5,520,368 A | * | 5/1996 | Braesch et al. | 254/274 |
| 5,613,419 A | | 3/1997 | Pierson et al. | |
| 5,816,132 A | | 10/1998 | Langner et al. | |
| 5,820,088 A | * | 10/1998 | Chapman | 248/161 |
| 5,915,673 A | | 6/1999 | Kazerooni | |
| 6,299,139 B1 | | 10/2001 | Kazerooni | |
| 6,313,595 B2 | | 11/2001 | Swanson et al. | |
| 7,264,226 B2 | * | 9/2007 | Smith et al. | 254/93 R |
| 7,264,434 B2 | * | 9/2007 | Kozak | 414/672 |
| 7,636,961 B1 | * | 12/2009 | Starkey | 5/11 |
| 2003/0189197 A1 | | 10/2003 | Kazerooni | |
| 2004/0047747 A1 | * | 3/2004 | Hsu | 417/375 |
| 2005/0200095 A1 | * | 9/2005 | Hopkins et al. | 280/124.161 |

* cited by examiner

PNEUMATIC MULTI-WEIGHT BALANCING DEVICE

CROSS REFERENCE TO RELATED APPLICATIONS

This application is a continuation of U.S. patent application Ser. No. 11/872,020, filed Oct. 14, 2007, now U.S. Pat. No. 8,105,008, issued Jan. 31, 2012, which claims the benefit of U.S. Appln. No. 60/948,989, filed Jul. 10, 2007, all of which are incorporated herein by reference.

FIELD OF THE INVENTION

The present invention relates to pneumatic load balancing devices capable of weightlessly balancing a load. More particularly, the present invention relates to pneumatic manipulators capable of semi-automatically balancing any desired load.

BACKGROUND

Lifting devices for lifting heavy loads are known in the art. One type of lifting device is the hoist or crane, which is capable of lifting loads vertically using cables, chains, ropes or the like. The use of flexible members means that a load cannot be rigidly positioned in three dimensional space, which is a disadvantage in certain applications. The manipulator is another type of lifting device capable of both lifting heavy objects and rigidly positioning objects in three-dimensional space. For example, pneumatically assisted manually operated manipulators have found widespread use. These manipulators typically consist of an arm that extends outwardly in a generally horizontal direction from a mast about which it is permitted to rotate and from which it is also permitted to pivot arcuately in a generally vertical direction in a pneumatically assisted manner via a lift cylinder. The arm may include one or more extension members serially disposed from an end of the arm distal from the mast that are similarly permitted to rotate and/or pivot. This arrangement permits the positioning of the distal end of the arm or extension member at a desired location in three dimensional space. An end effector is an attachment coupled to the distal end of the arm or extension member and adapted for the manipulation of a desired object or for the conduct of a particular task. For example, an end effector may include clamping means, pincer means, magnetic means or the like that are shaped and/or sized for the securement of a desired object to be positioned.

There are generally at least two types of manipulators. A conventional manipulator uses push-button controls connected directly with the lift cylinder to manually raise or lower the load by increasing or decreasing cylinder pressure. This type of manipulator includes no regulators or other pressure control system and functions merely by controlling the lift cylinder directly. Another type of manipulator is the load balancing manipulator. In a load balancing manipulator, a regulator in fluid communication with the lift cylinder is adjusted to a pre-determined pressure selected so that the weight of the object being manipulated is just balanced by the cylinder. In this manner, the object becomes weightless with respect to the operator, who is then able to manually position the object in three dimensional space. This allows the operator to quickly move and accurately position a work piece at a desired location in order to perform a certain task.

One problem with prior art load balancing manipulators is that the pressure of the cylinder must be pre-selected according to the weight of the load being balanced. This means that only loads of a single pre-determined weight may be moved using the manipulator. Normally, two regulators are provided; a first regulator for balancing the "no load" weight of the manipulator itself at a first pressure and a second regulator for balancing the "with load" weight of the manipulator and the load being carried at a second pressure greater than the first pressure. In certain instances, additional third or fourth regulators may be provided to allow the operator the flexibility to select additional discrete weights. This arrangement of pneumatic components means that the manipulator is fundamentally limited in only being able to lift a limited number of pre-selected weights.

Attempts have been made to make the second regulator dial-adjustable so as to allow an operator to adjust the pneumatic pressure until a particular load is balanced. Although this removes the limitation on pre-selection of the weights, the manipulator must be re-adjusted each time a load of different weight is lifted. This approach still limits the manipulator in terms of the flexibility to quickly lift any desired weight.

Attempts have been made in the prior art to provide automatically self-adjusting load balancing hoists for lifting any attached weight; however, these attempts have not been put into widespread commercial use with manipulators. In addition, fully automatic systems requiring no operator decision making to determine the pressure required to balance any particular load are complicated and expensive. A semi-automatic system that relies upon an operator decision to determine an appropriate load balancing pressure for the load being lifted is less complicated and often provides greater operator confidence than a fully automatic load balancing system.

U.S. Pat. No. 4,500,074 describes a fluid operated hoist having a pilot fluid controlled regulator for setting the load balancing fluid pressure of the hoist. A pilot fluid regulator is carried by a load carrying unit of the hoist. A linkage automatically adjusts the pressure provided by the pilot fluid regulator in response to lifting of the load to thereby adjust the pilot fluid controlled regulator. A manual bypass may also be engaged to actively lift the load. The linkage system adds complexity to the load carrying unit of the hoist and is potentially susceptible to breakdown. This system also uses at least two regulators to achieve load balancing; it would be desirable to reduce the number of regulators in order to reduce system complexity and increase reliability.

U.S. Pat. No. 3,526,388 describes a load balancing hoist having a novel valve mechanism for automatically sensing the pilot pressure necessary to balance a particular load. The novel valve is located on a load carrying member of the hoist. The novel valve introduces cost and complexity to the system and it would be desirable to eliminate the need for the novel valve.

U.S. Pat. No. 3,758,079 describes a load balancing hoist having a pressure sensor in the hoist chamber that is used to automatically determine the pressure required to lift the load. This system uses electronic controls, making it more complicated and expensive to implement and repair, and is susceptible to electronic malfunction.

U.S. Pat. No. 5,613,419 discloses an electronically controlled manipulator capable of lifting a plurality of loads. The manipulator employs electronic load cells to sense a load condition and has a microprocessor that automatically controls a valve in order to apply appropriate cylinder pressure to balance the load. Electronic controls introduce cost, complexity and likelihood of malfunction. It would be desirable to eliminate electronic controls, sensors, etc. in a load balancing manipulator.

U.S. Pat. No. 5,816,132 describes a load sensing pneumatic manipulator that automatically senses the outlet pneumatic pressure needed to maintain the load in a static condition and automatically adjusts this outlet pressure. Control over outlet pressure is less responsive and reliable than control over pressure applied directly to the lifting cylinder. To the knowledge of the inventor, this system has not been implemented commercially.

The devices disclosed in these prior art references are fully automatic, complex and not in widespread commercial use. None of these prior art references discloses a semi-automatic load balancing device capable of lifting any desired weight that is simple to operate and maintain. There is therefore still a need in the art for improved multi-weight balancing devices. Although many of the principles used in load balancing hoists may be applicable to pneumatic manipulators, significant differences can still exist. For example, in many applications it is important to be able to rigidly position a load in three dimensional space, which many load balancing hoists are unable to do. There is therefore a particular need in the art for improved multi-weight balancing pneumatic manipulators.

At present, most manipulators float the load in a balanced state, switching between a no-load balance point and a loaded balance point. The switching between states is normally done abruptly by causing a valve to switch from the no-load air pressure to the load pressure, and vise-versa. This abrupt switching poses the problem that it can sometimes lead to un-natural motion, which is disconcerting to operators. It would be desirable to improve upon this by providing more natural switching between conditions.

In addition, manipulators must be designed to be intrinsically safe in the event of a failure or unforeseen work condition. As a safety feature, there is usually a velocity fuse which restricts air flow if the flow in and out of the lift cylinder if it goes over a certain speed, or equipment similar to the velocity fuse to similarly limit air exhaust speed. Another speed limiting device that is sometimes used is a brake that engages when the manipulator arm is moved too quickly. As an additional safety measure, there may also sometimes be provided a device that bleeds the air in the lift cylinder if the supply pressure fails.

There are normally 3 emergency situations to deal with: [0017] 1. the loss of the load, where the load falls out of the jaws of the end effector, and the manipulator arm accelerates upwardly, out of control; [0018] 2. the loss of air supply pressure, for example due to an airline break on the manipulator or outside the manipulator, where the manipulator suddenly collapses, out of control; or, [0019] 3. an accidental activation of the end effector release mechanism.

In the first situation, the velocity fuse acts to trap the air in the lift cylinder, in a situation where the air should actually be exhausted as quickly as possible. The velocity fuse therefore acts to worsen the danger in a lost load situation.

In the second situation, most existing safety systems sensing the loss of air pressure employ a valve that either locks the air in the lift cylinder or drains it away slowly. They will not generally sense that the pressure is below a safe level; they sense only that the supply has been completely lost. In many situations, the supply drops to an intermediate level that is somewhat less than the minimum necessary to lift the load, but is still a substantial pressure insufficient to cause activation of the lift cylinder locking valve.

In the third situation, the objective generally is to quickly lower the lift cylinder pressure until it is at a level low enough that it is safe to open the jaws. This safe level can be the no-load pressure set to balance the weight of the manipulator when no load is present. When pressed prematurely, while the load is unsupported, the effect is a rapid descent of the manipulator, until the velocity fuse or brake limits the rate of descent. If the release mechanism has been pressed, it is desirable to lower the object as quickly as possible; however, rapid lowering of the object is impeded by the velocity fuse.

One additional problem caused by the use of a velocity fuse or a brake is that both of these devices undesirably limit the speed of movement of the manipulator during normal use. These devices must be set so that they engage quickly in a safety event. One drawback therefore is that these devices can sometimes be triggered when working quickly with the manipulator, as rapid movements of the operator cause air to exhaust at a rate comparable to the trip setting of the velocity fuse. This is disconcerting to operators, since the manipulator locks up and prevents further movement until the fuse is re-set. This can lead to widespread loss of production efficiency, particularly in an assembly line setting. Unlike hoists, which are provided to lift very heavy loads, manipulators are often provided to speed up work by allowing an operator to more naturally and quickly lift loads of a moderate weight; the problem of velocity fuse tripping is therefore more prevalent in manipulators than in hoists.

U.S. Pat. No. 3,791,627 discloses a load balancing hoist having three different bleed valves on the outlet of the main lift cylinder. The first two valves are for lowering the load by relieving air pressure from the lift cylinder. The third valve allows a slower release of air and is engaged as an alternative to the first two valves in the event of loss of air supply pressure. This allows the load to slowly be lowered to the ground. This system works only in the event of air supply failure, rather than lost load condition and is applicable to a hoist, rather than a manipulator.

There is therefore still a need in the art for improved safety devices for use with load balancing pneumatic manipulators, particular in the event of a lost load condition.

Various types of actuators are used to operate pneumatic valves. One type of actuator is the manual push button. Another is a solenoid operated via an electric switch. It is also known in the art to employ a neutrally biased sliding actuator or shuttle that reciprocates between upper and lower positions in order to operate two valves in a mutually exclusive fashion. However, these actuators are not known in combination with a semi-automatic system for balancing any load and can provide more intuitive operation than other actuator systems.

U.S. Pat. No. 3,880,393 discloses a manually operated shuttle valve containing two spring returned three way valves. The springs maintain the shuttle in a neutral position. When an operator lifts on the shuttle, an upper valve is engaged and when the operator pushes downwardly on the shuttle, a lower valve is engaged. These valves are connected to different portions of the pneumatic load balancing circuit.

U.S. Pat. No. 5,269,644 discloses a load balancer having a manual control switch comprising a reciprocating sleeve centrally spring balanced between two inductive proximity switches. Movement of the sleeve upwardly causes the upper switch to engage, and the lower switch to disengage; the opposite also applies. The shuttle is located near an operator controller of the load balancer.

The advantages of this type of actuator in combination with a semi-automatic load balancing pneumatic lifting device have not been previously realized.

SUMMARY OF THE INVENTION

According to the present invention, there is provided a load-balancing device comprising: a vertical mast; an arm extending outwardly from the mast, the arm pivotally attached at a proximal end to the mast to permit arcuate vertical movement of the arm relative to the mast; a pneumatic lift cylinder connected with the arm; an inflatable reservoir for storing a volume of air at a selected reservoir pressure, an inflation valve for controlling inflation of the reservoir; and, an amplifier in fluid communication with the reservoir, the amplifier for providing a separate flow of air to the lift cylinder at the reservoir pressure, the reservoir pressure selected to maintain the device in a balanced condition when a load is being lifted. The device may comprise a load-balancing pneumatic manipulator. The device may further comprise a deflation valve permitting deflation of the reservoir. The inflation and/or deflation valves may be operable from an operator control center using an actuator, for example a pneumatic push button or an electric switch. The inflation and deflation valves may be operable from the operator control center in a mutually exclusively fashion via a neutrally biased reciprocating actuator to selectively inflate or deflate the reservoir. The reservoir may comprise a closed vessel of a pre-specified volume. The reservoir may comprise a closed-ended length of tubing of pre-specified volume. The volume of the reservoir may be selected based in part upon the weight of the loads being lifted.

According to the present invention, there is further provided a method of semi-automatically lifting first and second objects of different weights using a load balancing device as previously described, the method comprising: securing the first object to be lifted using an end-effector; operating the inflation valve to increase the reservoir pressure to a value sufficient to place the device in a balanced condition when the first object is lifted; releasing the first object from the end-effector and reducing the reservoir pressure; securing the second object to be lifted using the end-effector; and, operating the inflation valve to increase the reservoir pressure to a value sufficient to place the device in a balanced condition when the second object is lifted. The reservoir pressure may be decreased automatically when the first object is released. Alternatively, the reservoir pressure may be decreased by operation of the deflation valve. The reservoir pressure may be decreased simultaneously with the release of the first object. The reservoir pressure may be decreased to a value sufficient to place the device in a balanced condition either when no load is lifted or when a load of minimum weight is lifted.

According to the present invention, there is yet further provided a load balancing pneumatic manipulator having a controlled air release system comprising: a pneumatic lift cylinder having a piston chamber with a vent for releasing air from the cylinder upon changes in volume of the chamber in order to maintain a substantially constant chamber pressure; a blocking valve in fluid communication with the vent that closes upon load release in order to preserve the chamber pressure; and, a release metering valve in fluid communication with the vent when the blocking valve is closed upon load release in order to reduce the chamber pressure at a first rate. The blocking valve may also close upon decrease of air supply pressure below a threshold value in order to preserve the chamber pressure. The threshold value may be greater than or equal to the pressure required to maintain the manipulator in a balanced condition when a load of maximum weight is being lifted; alternatively, the threshold value may be set at a value indicative of a loss of air supply pressure, for example slightly below the lowest supply pressure observed during routine operation. The threshold value may be greater than or equal to 70, 75, 80, 85, or 90 psi. The manipulator may further comprise a lost air supply metering valve in fluid communication with the vent when the blocking valve is closed upon decrease of air supply pressure below the threshold value in order to reduce the chamber pressure at a second rate. The second rate may be less than the first rate. The manipulator may yet further comprise a part present valve operable to cause air to be rapidly exhausted from the chamber in the event that a load being carried by the manipulator is inadvertently lost.

According to the present invention, there is still yet further provided a load balancing pneumatic manipulator having a controlled air release system comprising: a pneumatic lift cylinder having a piston chamber with a vent for releasing air from the cylinder upon changes in volume of the chamber in order to maintain a substantially constant chamber pressure; a blocking valve in fluid communication with the vent that closes upon decrease of air supply pressure below a threshold value or upon load release in order to preserve the chamber pressure; a release metering valve in fluid communication with the vent when the blocking valve is closed upon load release in order to reduce the chamber pressure at a first rate; and, a lost air supply metering valve in fluid communication with the vent when the blocking valve is closed upon decrease of air supply pressure below a threshold value in order to reduce the chamber pressure at a second rate. The manipulator may further comprise an operator activated release valve in fluid communication with the blocking valve, the release valve operable to close the blocking valve upon load release. The manipulator may yet further comprise a supply sense valve in fluid communication with the blocking valve, the supply sense valve operable to close the blocking valve upon decrease of air supply pressure below a threshold value. The supply sense valve may be adjustable to automatically close the blocking valve upon decrease of air supply pressure below the threshold value.

The foregoing invention provides many useful advantages. The use of a semi-automatic system for lifting any weight is less complex and less costly to manufacture than a fully automatic system. The use of a reservoir in place of a regulator allows any desired lift cylinder pressure to be selected at the touch of a push button, rather than by manual (e.g. dial type) adjustment. This in turn allows objects of different weights to be lifted with minimal operator intervention. The controls for adjusting reservoir pressure are robust and can be located on an operator control center (for example, near the end-effector) without fear of damage. The reservoir is also particularly amenable to use with a neutrally biased reciprocating actuator. This type of actuator allows the operator to gently lift upon handlebars of the operator control center until the reservoir pressure is sufficient to balance the weight of the object, at which point the actuator naturally returns to a neutrally biased position. This type of intuitive and seamless operation is of great advantage in an industrial setting, particularly when it is desirable to rapidly lift objects of different weights.

The air release system of the present invention provides improved safety as compared with prior art systems. By venting at a first rate during inadvertent or deliberate release of the object being lifted before it is appropriately positioned to do so, the system allows the object to be rapidly lowered in a controlled fashion without dropping the object. The use of a second rate upon loss of air supply pressure allows the manipulator to safely lower the object being lifted at a much slower rate, so that an operator has time to appropriately position it without damaging the object, while at the same time allowing the operator and bystanders to evacuate the immediate area. These advantages are obtained while at the same time eliminating the need for a velocity fuse, which is prone to being activated during normal work operations if an operator is working more quickly than the fuse is designed to allow. When a lost load condition exists, the lift cylinder is allowed to rapidly vent to prevent upward acceleration of the manipulator; this is an improvement as compared with use of a velocity fuse, which traps air within the lift cylinder and exacerbates the rapid acceleration problem. The combination of the foregoing provides a particularly safe and easy to use manipulator capable of allowing an operator to intuitively lift objects of different weights.

BRIEF DESCRIPTION OF THE DRAWINGS

Having summarized the invention, preferred embodiments thereof will now be described with reference to the accompanying drawings, in which.

DETAILED DESCRIPTION

Figure 1:
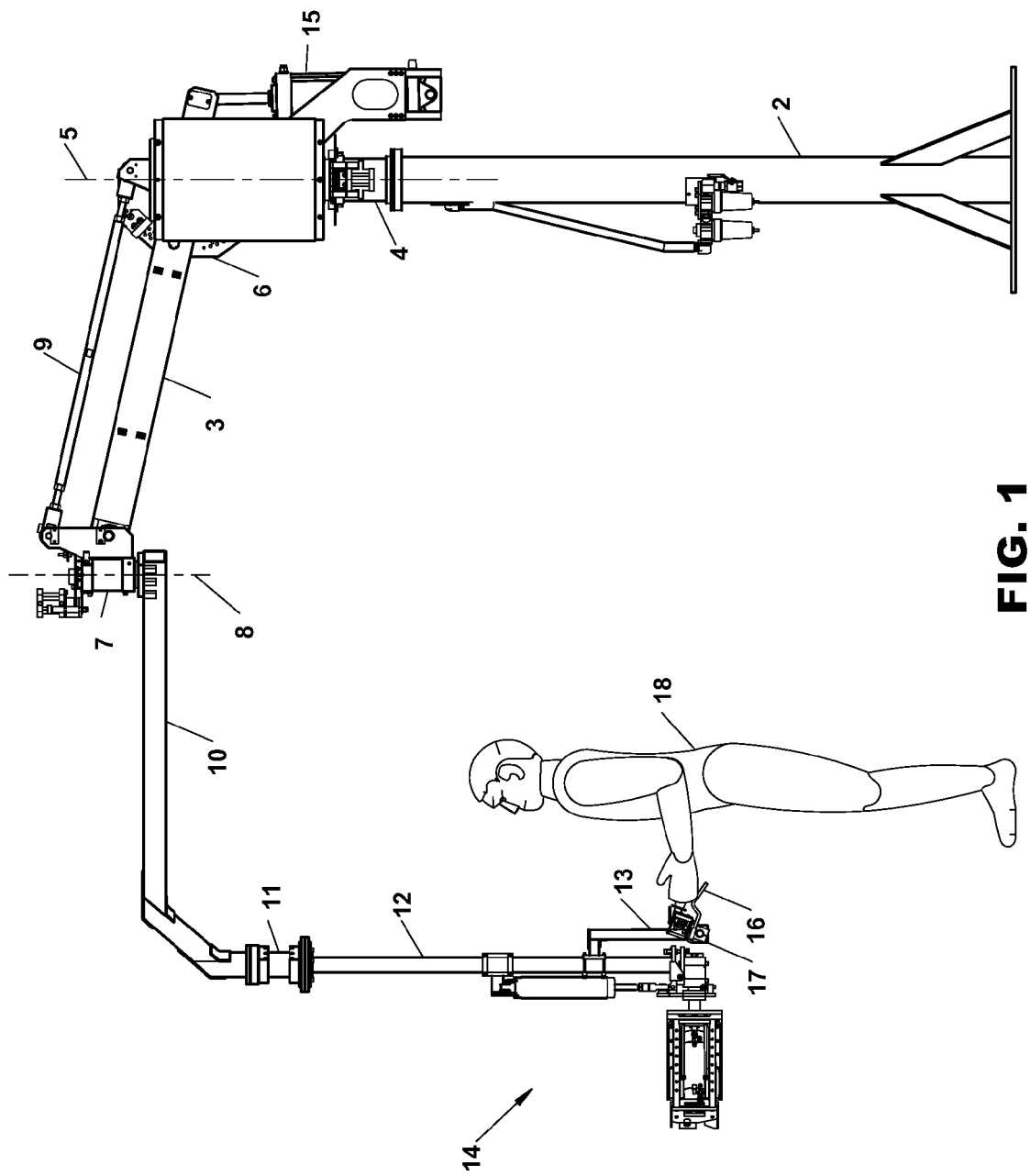
FIG. 1 shows a lifting device according to the present invention in side view.

Referring to FIG. 1a, a load balancing lifting device is shown. The lifting device comprises a pneumatically assisted manually operated load balancing manipulator, generally denoted as 1, that comprises a vertical mast 2 with a lifting member or arm 3 extending outwardly therefrom. The arm 3 is rotatably attached to the mast 2 by a first rotation means 4 that permits rotation of the arm about a first vertical axis 5 passing through the mast 2. The proximal end of the arm 3 is mounted to the first rotation means 4 by way of a pivot assembly 6 that permits the arm 3 to arcuately move as well as rotate. A second rotation means 7 is provided at the distal end of the arm 3 and is mounted in a manner that permits a second rotation axis 8 to remain vertical at all times, irrespective of the angular orientation of the arm 3. In the embodiment shown, the vertical orientation of the rotation means 7 is maintained using a parallelogram linkage 9, although other means, for example trunnion mounts or gimbals, could also be used.

One end of a horizontal extension member 10 is attached to the second rotation means 7 at the distal end of the arm 3. The opposite end of the horizontal extension member 10 includes a third rotation means 11 to which is mounted a vertical extension member 12. The length of both the horizontal and vertical extension members 10, 12 is chosen based on the intended application of the manipulator 1. Additional extension members, either horizontal or vertical, may be added depending on the range and degree of motion required for a particular application. An attachment 14, also known as an end-effector, is provided on the vertical extension member 12. The attachment 14 may be designed for special purpose or general purpose lifting operations and may comprise, for example, a clamp, a pincer, a magnet, a scoop, vacuum cups, etc. An operator control center 13 is provided proximal the attachment 14 that comprises a set of handlebars 16. In certain embodiments, the operator control center comprises a neutrally biased actuator 17, as will be described in greater detail hereinafter.

A pneumatic lift cylinder 15 supports the arm 3 via a linkage located near the proximal end of the arm and is operable to resiliently bias the arm against the weight of an object being carried by the manipulator. In operation, the pneumatic lift cylinder 15 normally has at least two operating pressures: a first (lower) pressure chosen to offset the weight of the arm and extension members so that the position of the manipulator may be manually adjusted; and, a second (higher) pressure chosen to offset the weight of the object as well as the arm and extension members. Switching from the first to the second pressures occurs when an operator 18 attempts to manually lift the object with the manipulator and switching from the second to the first pressure occurs when the object is released. In this manner, the manipulator appears to the operator to remain neutrally buoyant, irrespective of whether or not an object is being carried by the manipulator.

The pneumatically assisted manually operated load balancing manipulator shown here is but one embodiment of a suitable load balancing device. Persons skilled in the art will realize that various load balancing devices may be used in the same way to achieve the same function. In fact, any lifting device that permits an object to be rigidly positioned at a selected location in three-dimensional space in a pneumatically load balanced condition may be used.

Figure 2:
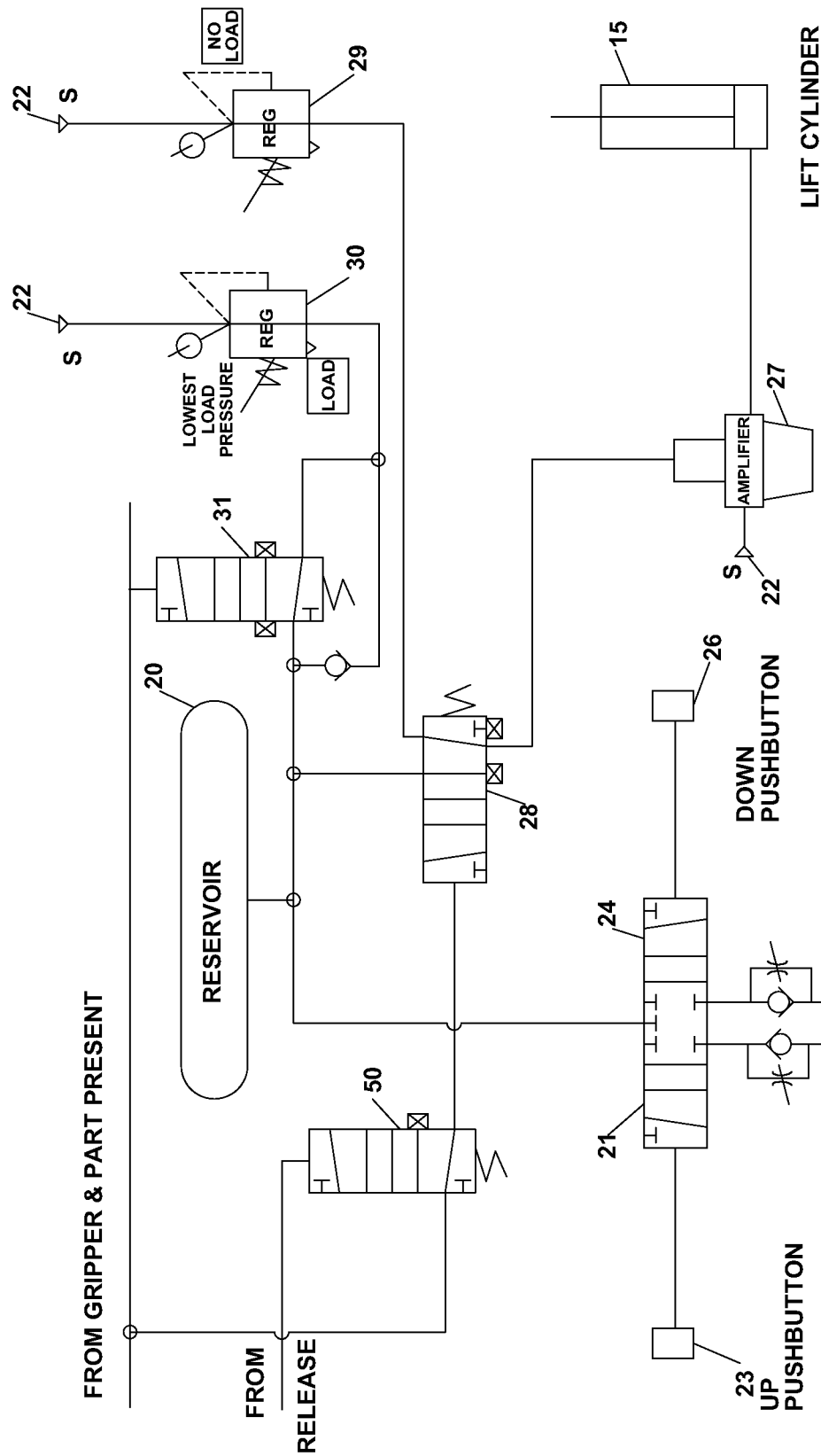
FIG. 2 shows a pneumatic circuit incorporating an inflatable reservoir for setting the lift cylinder load balancing pressure.

Referring to FIG. 2, a schematic diagram is shown whereby a reservoir 20 is inflatable by operation of an inflation valve 21, which opens to connect the air supply 22 with the reservoir. The inflation valve 21 is actuated by an inflation actuator 23 that comprises a push button or toggle located on the operator control center 13. When the inflation actuator 23 is released, the inflation valve 21 reverts to a normally closed condition. This causes inflation of the reservoir 20 to cease and stabilizes the pressure within the reservoir. A deflation valve 24 is also provided, which opens to connect the reservoir 20 to atmospheric conditions in order to allow air within the reservoir to be exhausted. In a similar manner to the inflation valve 21, the deflation valve 24 is actuated by a deflation actuator 26 comprising a push button or toggle that is located on the operator control center 13. Use of the deflation actuator 26 therefore causes the pressure within the reservoir 20 to decrease. In this manner, any desired pressure may readily be established within the reservoir 20.

The reservoir 20 is in fluid communication with a pressure controlled amplifier 27, also known as a volume booster, via a selector valve 28. The amplifier 27 provides a flow of air at the same pressure as established in the reservoir 20 to the lift cylinder 15. The pressure within the reservoir 20 can be set by the operator 18 at a value sufficient to offset the weight of the object being lifted through use of the actuators 23, 26, thereby establishing an identical pressure in the lift cylinder 15 and placing the load in a balanced condition. The selector valve 28 operates to complete the fluid connection between the amplifier 27 and the reservoir 20 only when the attachment 14 is activated and an object is confirmed to be secure for lifting. In this manner, the reservoir 20 is prevented from communicating a pressure to the lift cylinder 15 that could cause the manipulator to shoot upwardly in a potentially dangerous fashion if an object were not secured by the attachment 14. Under all other conditions, the selector valve 28 causes communication between a no-load regulator 29 and the amplifier 27. The no-load regulator 29 is in communication with the air supply and is set at a pressure sufficient to balance the weight of the manipulator itself; this allows the manipulator to be moved in a balanced condition when no object is being lifted.

This fail-safe arrangement of the selector valve 28 ensures that the manipulator is balanced at all times, regardless of whether or not a load is lifted.

The reservoir 20 is inflated each time an object is lifted and deflated when the object is released. This deflation of the reservoir 20 upon object release provides an important safety feature, preventing inadvertent upward movement if a lighter object is subsequently lifted. The reservoir 20 is preferably connected in a manner such that its minimum pressure is the pressure of the no-load regulator 29. This prevents the manipulator from collapsing under its own weight when a load is first engaged, prior to inflation of the reservoir 20 to the desired balancing pressure. In one circuit arrangement, an optional load regulator 30 can be used in combination with the reservoir 20, so that a higher minimum reservoir pressure is constantly maintained. This minimum reservoir pressure is provided via load valve 31 and preferably selected to correspond to the minimum load desired to be balanced by the manipulator, so that only a relatively small degree of inflation is required to lift heavier loads and little or no inflation is required to lift the minimum load. Although this arrangement allows a desired reservoir pressure (sufficient to balance a particular load) to be established more quickly than if the reservoir were inflated from no-load pressure each time, it also requires foreknowledge of the minimum load in order to set the load regulator 30 and introduces additional cost and complexity into the pneumatic circuit. For this reason, setting the minimum reservoir pressure at the no-load pressure is preferred in most circumstances; this obviates the need for the optional load regulator 30, thereby simplifying the pneumatic circuit and reducing the overall number of regulators.

Although the inflation valve 21 and deflation valve 24 are described as being separate, these valves may optionally be co-located or provided within a common body or housing. In one embodiment, the inflation valve 24 may comprise a three way valve which is operable to provide two mutually exclusive flow paths, one connected with the air supply and the other allowing the reservoir 20 to be exhausted. Persons skilled in the art will be able to contemplate other arrangements of components whereby the aforementioned function can be obtained and these variations are included within the scope of the present invention.

Figure 3A:
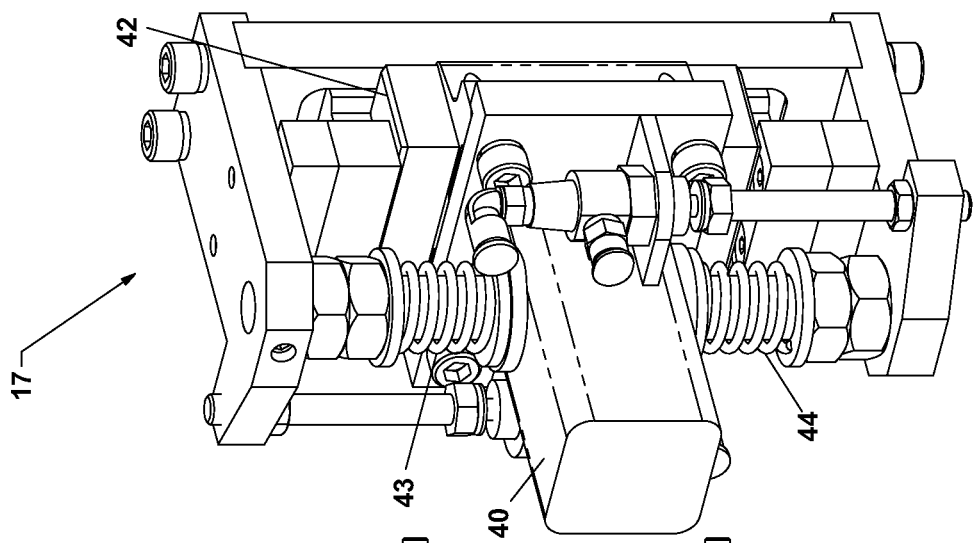
FIGS. 3a-c shows a neutrally biased reciprocating actuator for use in combination with the circuits of the present invention.
Figure 3B:
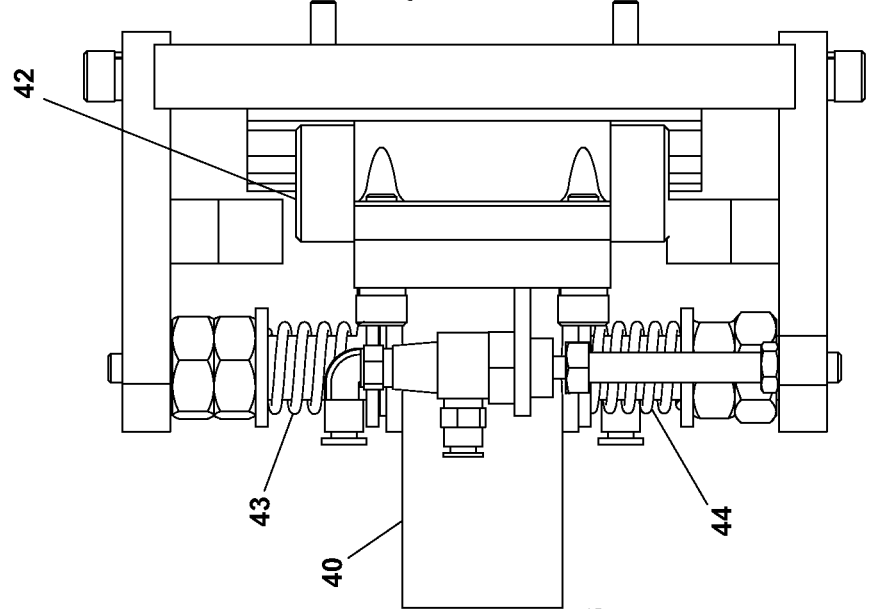
Figure 3C:
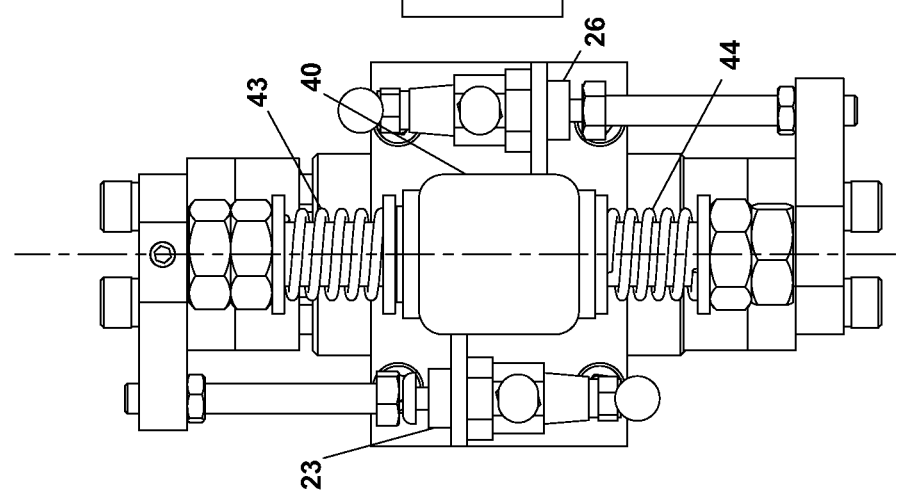

Referring to FIGS. 3a, 3b, 3c, in one embodiment the operator control center 13 may include a reciprocating actuator 17. The reciprocating actuator 17 includes a central block 40 to which handles 16 may be mounted. The central block 40 is vertically translatable upwardly and downwardly along a linear bearing or rod 42 and is resiliently biased toward a neutral position via upper and lower springs 43, 44. This permits temporary upward and downward movement of the block 40 from the neutral position in response to the operator 18 lifting up or pushing down on the handles 16. At the upper and lower limits of travel of the block 40, the inflation actuator 23 and deflation actuator 26, respectively, are engaged. The inflation and deflation actuators 23, 26 cause the inflation and deflation valves 21, 24 to operate in order to increase or decrease, respectively, the reservoir pressure. As used herein, the terms "operate" or "operable" generally mean that the valves are opened; however, arrangements can be contemplated by those skilled in the art whereby valves could be closed in order to achieve the same effect on reservoir pressure. When initially lifting the object, the operator 18 pulls upwardly on the handles 16, until the reservoir 20 is inflated sufficiently to balance the weight of the manipulator and the object being lifted. At this point, the object rises slightly and the handles 16 naturally return to their neutrally biased position, causing the reservoir pressure to stabilize. The reservoir 20 can thereby be inflated in a very natural manner by the operator 18 without requiring knowledge of the pressure need to balance the object. The actuator 17 may include a detente (not shown) or similar means to hold the block 40 in the neutral position until sufficient force is exerted to break the block free from the detente and move it toward its upper or lower extremity of travel. The actuator may include a manual lock feature (not shown) to prevent movement of the actuator once the reservoir pressure has been established.

One additional use of the reciprocating actuator 17 comes into effect particularly when very heavy loads are being lifted. In this case, the components of the manipulator system increase in size to the point that inertia, friction and air flow restrictions become more significant relative to the strength of the operator 18, even when the load is neutrally balanced. It can sometimes be useful to have a slight over-pressure (when raising) or under-pressure (when lowering) to aid in overcoming inertia. The pressure increase or decrease has the effect of gently boosting the manual raising or lowering of the object to assist the operator 18 in overcoming the inertia, friction and air flow restrictions of the manipulator system. By continuing to lift on the handles 16, even after the reservoir pressure has been increased to the point that the weight of the load is balanced, a slight over-pressure can naturally be established in the reservoir 20. Once the object has begun moving upwardly, pushing down on the handles 16 causes the pressure in the reservoir to decrease to the point that the load is again balanced. In this manner, a slight boost can be achieved naturally by the operator without introducing additional complexity to the operator controls and without the use of extra regulators or other equipment.

Figure 4:
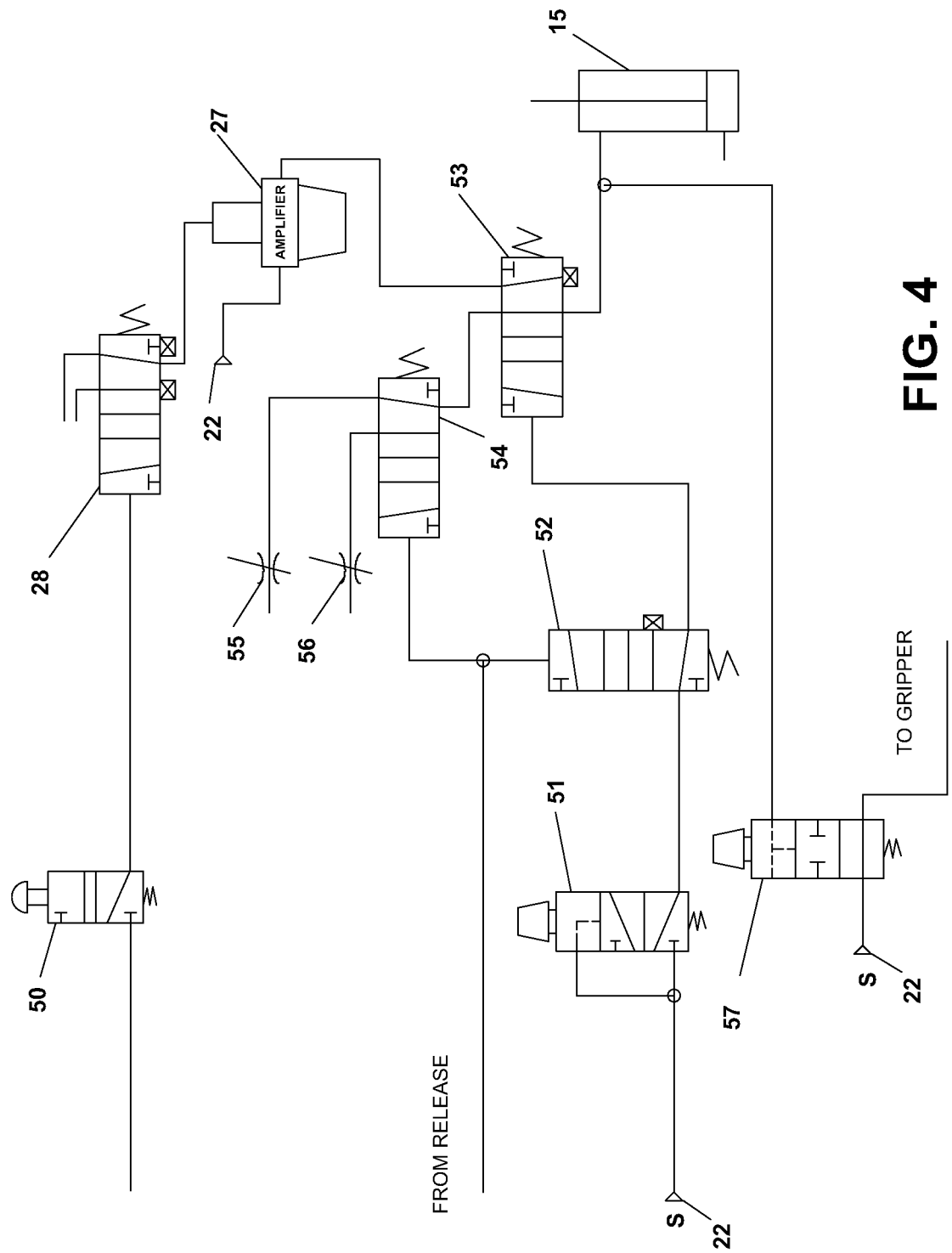
FIG. 4 shows a pneumatic circuit for an air release system incorporating two bleed valves having two different venting rates; and, FIG. 5 shows a combined pneumatic circuit incorporating the features of both FIG. 2 and FIG. 4.

Referring to FIG. 4, a selector valve 28 is provided in combination with an amplifier 27 in order to selectively provide a no-load or load balancing lift cylinder pressure to the lift cylinder 15, depending upon the position of the selector valve 28. The no-load pressure is provided by a no-load regulator 29 and the load balancing pressure can be provided by an inflatable reservoir 20 or a load regulator 30 in combination therewith, all as previously described with reference to FIG. 2. The selector valve 28 only directs the load balancing pressure to the amplifier 27 when the part present valve 50 operates to provide a pressure signal indicating that an object is secured by the attachment 14. In a lost-load condition, the pressure signal from the part present valve 50 is lost and the selector valve 28 reverts to its normal position in which the no-load pressure is supplied to the amplifier 27. The lift cylinder then rapidly vents so that the manipulator does not shoot upwardly, potentially endangering the operator 18 or bystanders. With appropriate component selection, the lift cylinder 15 can be vented in less than one second during this condition.

In the event of an air supply failure, the loss of pressure signal is transmitted by the supply sense valve 51 to the blocking valve 53 via the override valve 52. The supply sense valve 51 is adjustable and may be set at any desired threshold value to indicate a loss of supply. This value can be greater than or equal to the pressure required to maintain the manipulator in a balanced condition when a load of maximum weight is being lifted. In this case, when any loss of air supply occurs that is insufficient to maintain the manipulator in a balanced condition when the heaviest load is present, the manipulator goes into a shut-down condition, thereby providing safety under all possible load conditions. In cases where the maximum load is not known in advance, the threshold may be set at a value which indicates a loss of air supply, for example a value that is slightly lower than the minimum pressure experienced during normal fluctuation through use. The loss of pressure signal is then relayed to the blocking valve 53, which moves into its normally closed position to block exhausting of air from the lift cylinder 15 backward through the amplifier 27. Air is thereby permitted only to exhaust from the cylinder chamber vent through the release selector valve 54. The normal position of the release selector valve 54 is to a flow path passing through an air loss metering valve 55. This valve is set with a relatively slow flow rate to allow the pressure trapped within the chamber of the lift cylinder 15 to slowly leak out until the object being lifted comes to rest gently on the ground.

When an object is released from the attachment 14, either during normal operating conditions or by accident, the pressure signal to the release selector valve 54 is exhausted. This causes the release selector valve 54 to direct its flow path through a release metering valve 56. The release metering valve 56 permits a higher flow rate than the air loss metering valve 55 so that air is more rapidly vented during normal release conditions. An added safety benefit is provided through improved operation of the load sense valve 57. The load sense valve 57 is provided to monitor the pressure in the lift cylinder 15 and allow the attachment 14 to release the object being lifted only when the pressure has reached a lower and safer level. The controlled rate of descent provided by the release metering valve 56 makes the operation of the load sense valve 57 much more reliable, since it can more easily track and respond to a slower-moving change in pressure within the lift cylinder 15.

Figure 5:
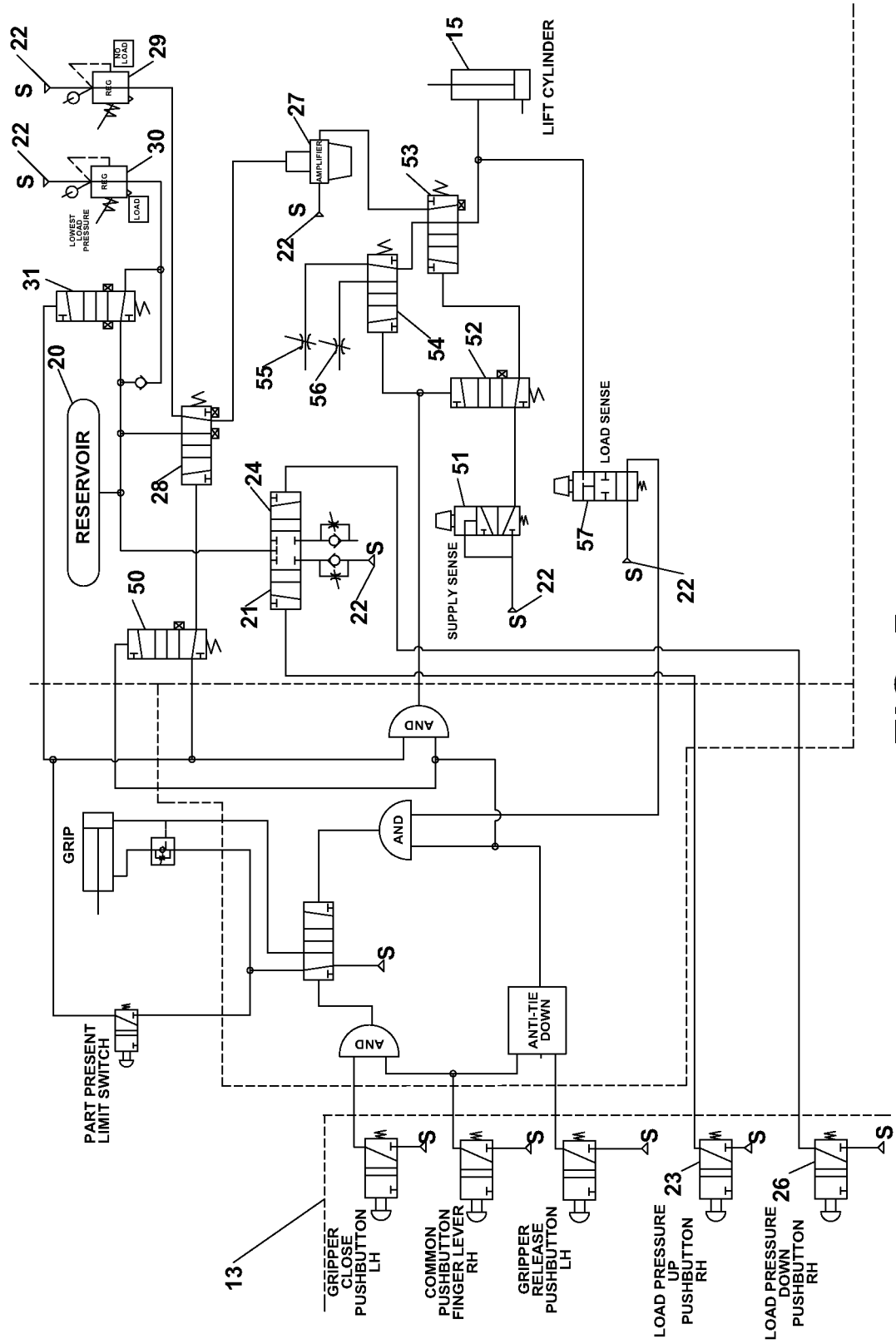

Referring to FIG. 5, a combined pneumatic circuit is shown that incorporates the features of FIG. 2 and FIG. 4. Like features are denoted by like reference numerals. The features described with reference to FIGS. 2 and 4 can be provided separately or in combination in a manipulator according to the present invention. When provided in combination, the result is a semi-automatic load balancing manipulator that allows any weight to be lifted quickly and safely.

The foregoing embodiments are illustrative of the invention and are meant to be construed in a non-limiting sense. Those skilled in the art will recognize that further features, variation and sub-combinations of the present invention may be provided without departing from the spirit of the invention as described herein, and are intended by the inventor to be encompassed by the following claims.

What is claimed is:

1. A load-balancing device comprising:
   a lifting member;
   a pneumatic lift chamber operably connected with the lifting member and configured to provide a raising force to said lifting member;
   an inflatable reservoir for storing a volume of air at a reservoir pressure selected to maintain the device in a balanced condition when a load is being lifted by said lifting member,
   an inflation valve for controlling inflation of the reservoir in order to set the reservoir pressure in response to operator input;
   an amplifier in fluid communication with a pressurized air supply and in independent selective fluid communication with the reservoir, the amplifier providing a flow of air from the pressurized air supply to the lift chamber at the reservoir pressure while the device is engaged with the load; and,
   a selector valve coupled to said reservoir and to said amplifier and configured to provide the reservoir pressure from said reservoir to said amplifier while the device is engaged with the load, the reservoir pressure causing said amplifier to regulate the pressurized air supply to said lift chamber to balance the load.

2. The load balancing device according to claim 1, wherein the device further comprises a deflation valve permitting deflation of the reservoir.

3. The load balancing device according to claim 2, wherein the device further comprises an operator control center and wherein the inflation and/or deflation valves are operable from the operator control center.

4. The load balancing device according to claim 3, wherein the inflation and/or deflation valves are operable via a push-button.

5. The load balancing device according to claim 3, wherein the inflation and deflation valves are operable from the operator control center in a mutually exclusively fashion via a neutrally biased reciprocating actuator to selectively inflate or deflate the reservoir.

6. The load balancing device according to claim 1, wherein the device further comprises a no-load pressure regulator for setting a no-load pressure of the amplifier, the no-load pressure selected to maintain the device in a balanced condition when no load is being lifted.

7. The load balancing device according to claim 1, wherein the device comprises a pneumatic manipulator.

8. The load balancing device according to claim 1, wherein the device further comprises a lowest load regulator for supplying a minimum load pressure to the reservoir, the minimum load pressure selected to maintain the device in a balanced condition when a load of minimum weight is being lifted.

9. The load balancing device according to claim 8, wherein the reservoir is deflated to the minimum load pressure upon release of the load.

10. The load balancing device according to claim 9, wherein the minimum load pressure is greater than the no-load pressure.

11. The load balancing device according to claim 9, wherein the minimum load pressure is equal to the no-load pressure.

12. The load balancing device according to claim 1, further comprising:
   a vent for releasing air from the chamber upon changes in volume of the chamber in order to maintain a substantially constant chamber pressure;
   a blocking valve in fluid communication with the vent that closes upon load release in order to preserve the chamber pressure; and
   a release metering valve in fluid communication with the vent when the blocking valve is closed upon load release in order to reduce the chamber pressure at a first rate.

13. The load balancing device according to claim 12, wherein the device further comprises an operator activated release valve in fluid communication with the blocking valve, the release valve operable to close the blocking valve upon load release.

14. The load balancing device according to claim 12, wherein the blocking valve also closes upon decrease of air supply pressure below a threshold value in order to preserve the chamber pressure.

15. The load balancing device according to claim 14, wherein the device further comprises a lost air supply metering valve in fluid communication with the vent when the blocking valve is closed upon decrease of air supply pressure below the threshold value in order to reduce the chamber pressure at a second rate.

16. The load balancing device according to claim 15, wherein the second rate is less than the first rate.

17. The load balancing device according to claim 12, wherein the device further comprises a supply sense valve in fluid communication with the blocking valve, the supply sense valve operable to close the blocking valve upon decrease of air supply pressure below a threshold value.

18. The load balancing device according to claim 17, wherein the supply sense valve is adjustable to automatically close the blocking valve upon decrease of air supply pressure below the threshold value.

19. The load balancing device according to claim 14, wherein the threshold value is greater than or equal to the pressure required to maintain the device in a balanced condition when a load of maximum weight is being lifted.

20. The load balancing device according to claim 12, wherein the device further comprises a part present valve operable to cause air to be rapidly exhausted from the chamber in the event that a load being carried by the device is inadvertently lost.

* * * * *